Figure 1:
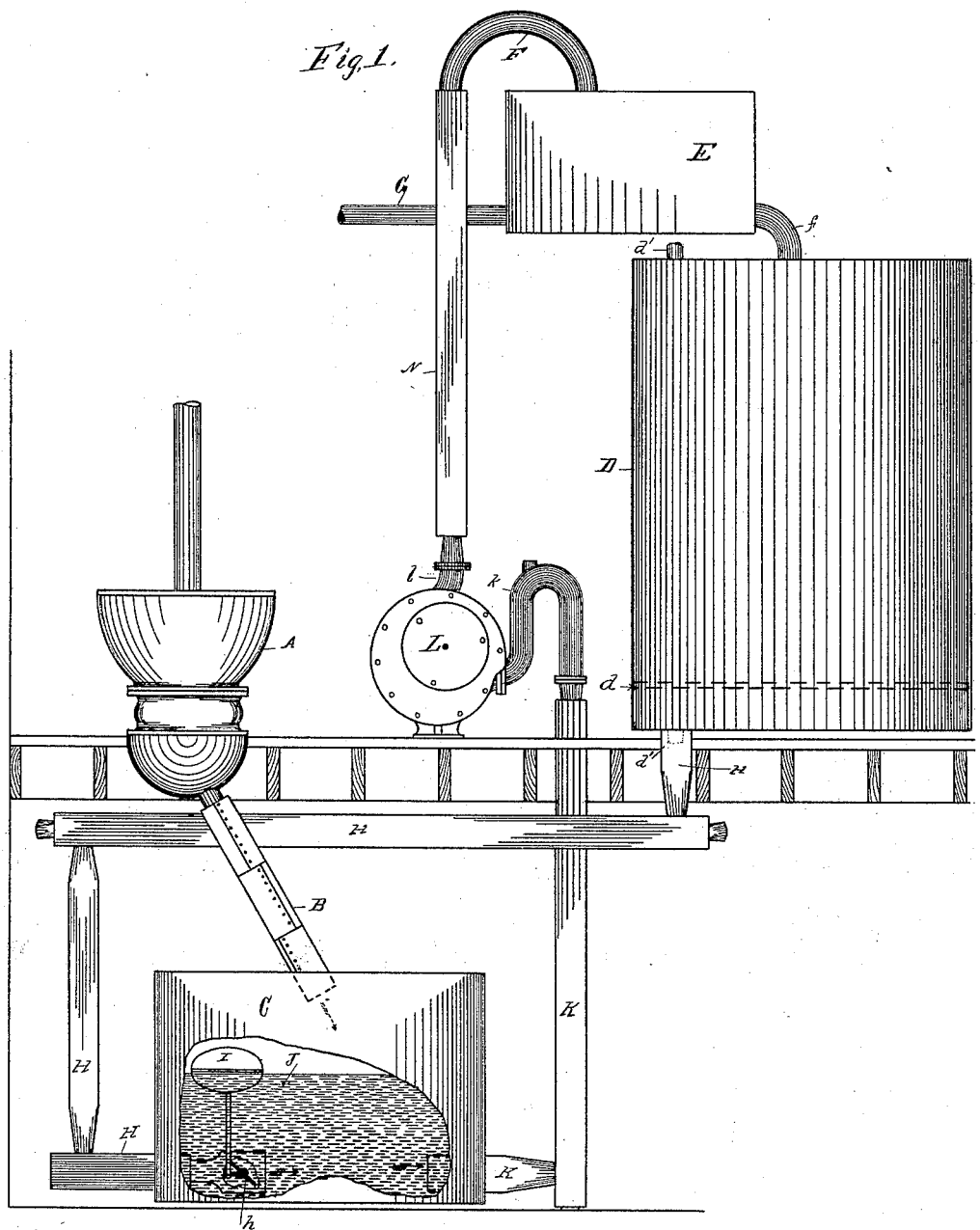

(No Model.)

E. F. SMITH.
PROCESS OF LEACHING TAN BARK.

No. 409,876. Patented Aug. 27, 1889.

Witnesses.
G. A. McDannell
H. J. Curtz

Inventor.
Edward F. Smith
By A. S. Sturgeon
Atty.

UNITED STATES PATENT OFFICE.

EDWARD F. SMITH, OF CORRY, PENNSYLVANIA.

PROCESS OF LEACHING TAN-BARK.

SPECIFICATION forming part of Letters Patent No. 409,876, dated August 27, 1889.

Application filed October 26, 1888. Serial No. 289,249. (No specimens.)

*To all whom it may concern:*

Be it known that I, EDWARD F. SMITH, a citizen of the United States, residing at Corry, in the county of Erie and State of Pennsylvania, have invented certain new and useful Improvements in the Mode and Process of Handling and Leaching Tan-Bark; and I do hereby declare the following to be a full, clear, and exact description of the invention, such as will enable others skilled in the art to which it appertains to make and use the same, reference being had to the accompanying drawing, and to the letters of reference marked thereon, forming part of this specification.

My invention consists in the method and process of handling and leaching ground tan-bark, hereinafter set forth and described, and illustrated in the accompanying drawing, in which the figure shows a view in elevation of a suitable and convenient apparatus for utilizing my invention.

The process of handling and leaching tan-bark embodied in my invention consists in conveying the ground bark directly from the bark-mill into a tank of water or liquor, from whence the bark and water or liquor intermixed are conveyed again into a steam-box, where they are thoroughly steamed during their passage through the steam-box, so as to soften and open up the pores of the bark, from whence they pass into the upper part of the leach, after which the fluid passes down through the bark which remains therein and out of an opening in the bottom of the leach and through pipes back to the bark-receiving tank, where it again operates to saturate fresh bark as it comes from the mill, and is again conveyed with such bark back into the steam-box, where, it being again steamed with the bark, passes back with the bark into the top of the leach, this operation being continuous until a sufficient quantity of ground bark is treated and delivered into the leach.

The objects of my invention are, first, to entirely do away with the dust ordinarily arising from the ground bark during the handling and conveying of the same into the leach, and, second, to first intermix and saturate the bark with fluid and afterward thoroughly steam the bark and fluid so intermixed before they are delivered into the leach, instead of delivering the dry ground bark into the leach in the usual manner, and thus not only overcome the tendency of the dry bark to float on the top of the fluid in the leach, but to first soften up the bark by wetting and steaming it, so that the fluid in the leach will act upon it at once.

In the mechanism for utilizing my invention (shown in the accompanying drawings) A is a bark-mill of usual and ordinary construction, located preferably in the second story of a building.

B is a discharge-pipe running into a closed tank C on the floor below.

D is the leach, preferably located in the same floor as the bark-mill A, and having a false bottom $d$. (Shown in dotted lines.)

E is a closed heater of usual and ordinary construction, having an inlet-pipe F in the upper part thereof and a discharge-pipe $f$ from the lower part thereof into the leach D, and G is a steam-pipe for supplying steam to the heating-box E.

From the bottom of the leach D, below the false bottom $d$ thereof, a drain-pipe H passes down to and into one corner of the bark-receiving tank C, where it is provided with a valve $h$, operated by a float I, which operates to prevent the fluid J rising high enough in the box C to overflow. A plug $d'$, reaching from the mouth of the pipe H to and above the top of the leach D, is also provided for closing the mouth of the pipe H when necessary. In the opposite corner of the receiving-tank C is an outlet-pipe K, which leads to the suction-pipe $k$ of a rotary pump L, and from the discharge-pipe $l$ of the pump a pipe N leads to and connects with the inlet-pipe F in the top of the heating-box E.

In operation the bark is ground in the mill A, from whence it flows through the discharge-pipe B into the receiving-tank C, where it becomes thoroughly saturated with the fluid J therein. From the tank C the bark and fluid mixed together are elevated through the pipe K by the action of the rotary pump L and discharged into the heater E, where the bark and fluid intermixed are subjected to the action of the hot steam from the pipe G, after which they flow into the leach D through the discharge-pipe f, the bark remaining therein, while the fluid drains down through the false bottom d and passes down through the pipe H into the tank C, where it again takes up a fresh supply of ground bark, and with it is again elevated, heated, and discharged into the leach D, this process being continuous until the leach is filled with ground bark, when the plug d' is inserted in the mouth of the pipe H and the outflow of fluid stopped.

In my process it is obvious that the bark and fluid are thoroughly intermixed and heated before being delivered into the leach, instead of heating the fluid alone and delivering the bark dry into the leach, as is the usual custom. In this manner I am enabled to leach the bark much more quickly and thoroughly than is possible by the ordinary modes and processes now in use.

Having thus described my invention so as to enable others to make use of the same, what I claim as new, and desire to secure by Letters Patent of the United States, is—

1. A method and process of handling and leaching tan-bark, consisting in delivering the ground bark directly from the bark-mill into a tank of fluid with which it is intermixed, and then conveying the intermixed bark and fluid into a steam-box, where they are steamed during their passage through said steam-box, and from whence they pass into the top of the leach, substantially as and for the purpose set forth.

2. A method and process of handling and treating tan-bark, consisting, first, of saturating and intermixing the ground bark with fluid; second, of conveying the bark and fluid so intermixed into a steam-box, and, third, of steaming the intermixed bark and fluid during their passage through such steam-box, after which they pass into the top of the leach, substantially as and for the purpose set forth.

In testimony whereof I affix my signature in presence of two witnesses.

EDWARD F. SMITH.

Witnesses:
L. JACKSON,
WM. P. HAYES.